United States Patent [19]

Dondl

[11] Patent Number: 4,502,051
[45] Date of Patent: Feb. 26, 1985

[54] TELECOMMUNICATION SYSTEM WITH SATELLITES POSITIONED IN GEOSTATIONARY POSITIONAL LOOPS

[75] Inventor: Peter Dondl, Rossdorf, Fed. Rep. of Germany

[73] Assignee: Siemens Aktiengesellschaft, Berlin and Munich, Fed. Rep. of Germany

[21] Appl. No.: 347,697

[22] Filed: Feb. 11, 1982

[30] Foreign Application Priority Data

Feb. 28, 1981 [DE] Fed. Rep. of Germany ....... 3107762
Nov. 13, 1981 [DE] Fed. Rep. of Germany ....... 3145207

[51] Int. Cl.³ .............................................. H04B 7/19
[52] U.S. Cl. .................................................... 343/356
[58] Field of Search ............... 343/352, 354, 355, 356, 343/357, 361; 244/158

[56] References Cited

U.S. PATENT DOCUMENTS 3,163,820  12/1964  Hight .................................. 244/158
3,243,706   3/1966  Grisham ......................... 343/352 X

FOREIGN PATENT DOCUMENTS 2952317  7/1981  Fed. Rep. of Germany .

Primary Examiner—Theodore M. Blum
Assistant Examiner—John B. Sotomayor
Attorney, Agent, or Firm—Hill, Van Santen, Steadman & Simpson

[57] ABSTRACT

A telecommunication satellite system in which its activated satellites are placed in geostationary positional loops and consist of asynchronously orbiting satellites of identical telecommunication functions on circular or elliptical paths which are inclined relative to the equitorial plane with all of the satellites moving on the same path relative to the view of a fixed earth station and where the apparent path in the form of loops intersect or contacts at equal intervals around the sphere as shown in FIG. 1. The points of intersection and of contact KP of the apparent path are simultaneously met by two satellites with one on each of the two orbit branches. At the time of the smallest spacing between the two satellites the telecommunication pay-load of the satellite leaving the geostationary loop is inactivated and the other satellite simultaneously entering the geostationary loop is activated by a control center. In this manner, ground communication stations can function by way of one satellite in one of the geostationary loops at all times without interruption at time of change-over to the other satellite.

9 Claims, 4 Drawing Figures

TELECOMMUNICATION SYSTEM WITH SATELLITES POSITIONED IN GEOSTATIONARY POSITIONAL LOOPS

BACKGROUND OF THE INVENTION

1. Field of the Invention

This invention relates in general to satellite telecommunication systems and particular wherein the satellites have geostationary positional loops and consist of several satellites of identical telecommunication functions which orbit on circular or elliptical paths which are inclined relative to the equatorial plane.

2. Description of the Prior Art

In telecommunication satellite systems using geostationary orbit positions, communication earth stations can remain permanently directed to a satellite or, respectively, to a position and can operate telecommunications traffic in sequence without interruption. The unavoidable slight positional deviations of the satellite are compensated by means of follow-up by the communication earth station antennas.

Systems with geostationary telecommunication satellites which are positioned on geostationary orbits in equatorial plane are known. It is also known how to create quasi-stationary orbit positions north and south of the geostationary orbit with the assistance of a plurality of so-called geosynchronous satellites which have orbital nodes that lie on the same orbit position. These positions are successively assumed and reached by the participating satellite in stratified operation. For the purpose of radio-engineering decoupling, satellites which are underway between the quasi-stationary positions are switched as discussed in the publication International Telecommunications Union of Geneva CCIR 4/71-E. For reasons of orbital and radio-engineering necessities, both geostationary satellites as well as geosynchronous satellites with quasi-position are situated on or very close to the geostationary orbit. The exploitation of this small belt around the earth for geostationary telecommunication satellite systems will become significantly overcrowded in the future. Also, the geostationary belt has the disadvantage that for countries which lie far to the north or far to the south of the equator due to the low elevation angle, the electromagnetic waves must travel a long path through the atmosphere thus having a negative effect on the quality and reliability of the satellite connections at higher frequencies. Also, systems with a plurality of orbiting telecommunication satellites are known which have the advantage of being able to service northern and southern countries (Molnia Program, Soviet Union), but however, these systems have the disadvantage in that the participating satellites wherein one terminates its service and the next begins its service simultaneously are not approximately located at the same point of the celestial sphere at the changeover time. This results in that either the associated earth station must be equipped with two antennas or operations must be temporarily interrupted during the changeover.

An additional disadvantage with known geostationary as well as traditional orbiting satellites lies in the fact that if one does not wish to accept considerable down times a backup satellite must be available for every satellite in an orbit close to the operating satellite.

SUMMARY OF THE INVENTION

It is an object of the present invention to provide geostationary orbital positions which extend far to the north and far to the south of the equator which are operatable even for high frequencies. This object is inventively achieved by having the following features:

(a) from a fixed earth station all participating satellites apparently move on the same path in preferably chronological equal spacings wherein the apparent path appears to be a loop which intersects or respectively contacts itself at equal intervals around the globe, (b) the points of intersection are respectively contact of the apparent path are simultaneously traversed by two respective satellites with one on each of the two orbital branches, and (c) at the time when the smallest distance between the two satellites exists, the useful telecommunication load of the satellite leaving the geostationary loop is deactivated by the control center whereas the satellite simultaneously entering the geostationary loop is activated.

In the present invention, the earth stations which sequence telecommunications traffic by way of a respective satellite in one of the geostationary loops can continuously work without interruption in the area of the geostationary loops despite the changeover to the other satellite.

An additional significant advantage of the invention comprising a telecommunication satellite system makes it possible to limit the number of satellites to one-half if elliptical orbits are employed wherein only one of the two hemispheres is utilized. A further advantage when using elliptical orbits is the free selectability of the inclination with a given plurality of satellites in which large inclinations result in great eccentricity of the orbital ellipses. When using circular orbits, the inclination results from the number of satellites and the prescribed time of a revolution.

In order to switch from one to the other satellite to avoid polarization skip of the transmitted and the received electromagnetic waves and to guarantee the retention of the provided coverage zones in the loop traversal of the satellites, the antennas of the participating satellites are not related to the actual satellite orbits by requiring observation of the roll axis, the pitch axis and the yaw axis but, in a further development of the invention, they are aligned in proper polarization to the reference earth station in communication with the respective geostationary loops according to the reception of the linearly polarized beacons. In order to allow operation with frequency-reemployment and to assure that all participating earth stations are automatically guided with proper polarization by means of dual cross-polarization, the earth station antennas are mounted as follows. Assuming alignment to the nominal position of the respective geostationary loop, the cross of axes of the cardanic antenna suspension of the respective earth stations particularly of the reference earth station lie in one plane which extends parallel to the horizontal plane of the sub-point of the nominal loop position. This refers to the nominal loop position NP which is the point which lies half-way between the apex SP and the point of intersection KP within the loop. Azimuthal and elevational axes are unsuitable in the invention.

The inventive antenna support is an advantageous further development of the invention disclosed in German OS No. 29 52 317 which discloses the specific alignment of a geostationary satellite in the general case of a random nominal position which does not lie above the equator. As in the aforementioned German patent application, the direction of maximum radiation of the antenna is not necessarily perpendicular to the axes so that a pivotal motion around one of the axes sweeps over the generated surface of a flat cone. Thus, the pivot motion also contains a rotating component around the direction of maximum radiation which compensates for the error which would arise due to the positional follow-up.

The advantages obtainable with the invention result in opening up geostationary orbital positions far to the north and far to the south of the geostationary orbit. From the point of view of the automatically trackable earth stations, the satellites describe closed loops in a small range. Thus, a continuous interruption free telecommunication operation is possible as with satellites in the geostationary orbits. When crossing the equator, the satellites are in their inactive phase and do not result in a disruptive influence on the geostationary satellites. For northerly or, respectively, southerly radiating areas the path of the radial length through the atmosphere is significantly shorter for the waves particularly where the radio traffic operation is facilitated at high frequencies as, for example, at 20/30 GHz.

Compared to traditional systems with orbiting satellites, the advantage of the invention lies in interruption-free operation without requiring earth stations with two separate antennas.

The apparent disadvantage of only being able to exploit the active satellites for half of the time turns out in actual practice upon closer study not to be a serious drawback. Geostationary satellites require backup satellites in order to be able to continue operation after a short interruption time when the outage of an operating satellite occurs. In contrast, the outage of a satellite with a backup satellite for the geostationary loops in the present invention results in a maximum down time of only one loop traversal. This time can be significantly shortened depending upon the position of the earth stations because the following satellite is already activated before it enters the loop and vice versa, the proceeding satellite can be operated beyond the loop. This interruption due to the down satellite only reoccurs for each loop position at intervals of a number of days as, for example, only after two days in the sample embodiment described in detail below. Presuming that these outage intervals can be operationally managed than backup satellites are not necessary for each individual operating satellite.

A few backup satellites for the entire system on one or more parking orbits from which the orbits of the system are easy to reach will be sufficient.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
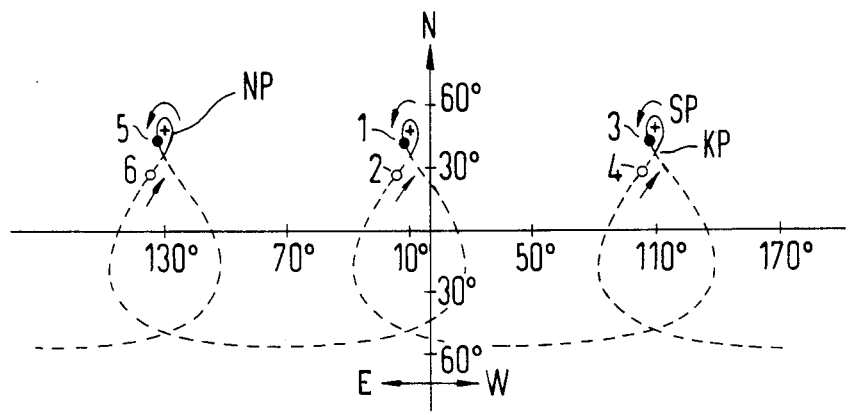
FIG. 1 is the apparent track of the inventive satellites of the telecommunication system.

FIG. 1 illustrates the sample embodiment wherein only one satellite is located in each active and in each inactive range of the apparent satellite orbit, although a plurality of satellites could be accommodated if desired. The system of FIG. 1 uses six satellites of identical telecommunication functions with three being actively situated in their loops and the remaining three traverse the equator twice in their inactive states. The time of revolution of the satellites is equal to two-thirds of the time for the earth to turn around once on its axis in other words, approximately 16 siderial hours. The maximum distance from the earth's surface is approximately 40,000 km. Both the active as well as the inactive intervals correspond to half the time of revolution in other words, approximately 8 siderial hours. In this sample embodiment, the satellite orbits have an inclination of approximately 54.7° and, thus, the apexes SP of the geostationary loops will be at 54.7° north. The orbit intersects itself in each loop KP at a point approximately 35.3° north of the equator. The loops have an east-west width of less than 11.3°. At 49° north latitude, this corresponds to an arc of less than 7.4°.

In the sample embodiment, the latitude coordinates of the nominal loop positions NP are calculated to be at 45° north latitude. If a nominal loop position is selected to be at the longitudinal coordinate of 10° east longitude which is approximately over Milan, Italy, then the other two nominal loops will be at 130° east longitude over Manchuria, China and 110° west longitude over the State of Wyoming in the United States. All of these are in the northern hemisphere. In this sample embodiment, the least favorable German ground communication station will be located at Flensburg, Germany at which location the antenna must be followed up from the Zenith loop apex to a minimum 67° elevation loop intersection within approximately eight siderial hours. That is the time in which each satellite travels through a loop from the point of intersection of the loop along the loop back to the point of intersection of the loop. After that the following satellites assume the transmission and likewise being situated at the point of intersection of the loop at the time of transfer of communication. The shut-down of one antenna and the activation of the other antenna is accomplished by use of the same signal from the earth station of the control center. Particularly given access or respectively, transmission methods such as TDMA time division multiple access, the changeover time can be placed in the protection time between two transmitted signal bursts. The protection time during the changeover is sufficiently long such that differences of transit times as, for example, caused by different satellite altitudes will not lead to burst overlaps.

FIG. 1 schematically illustrates the apparent orbit of the six satellites which are illustrated as solid circles during their active phase and as blank circles during their inactive phases. The satellites are numbered according to their chronological sequence as they traverse the geostationary loops. The geographical degrees of longitude are indicated horizontally and the geographical degrees of latitude are plotted vertically.

The letters N, E and W respectively represent north, east and west.

Figure 2:
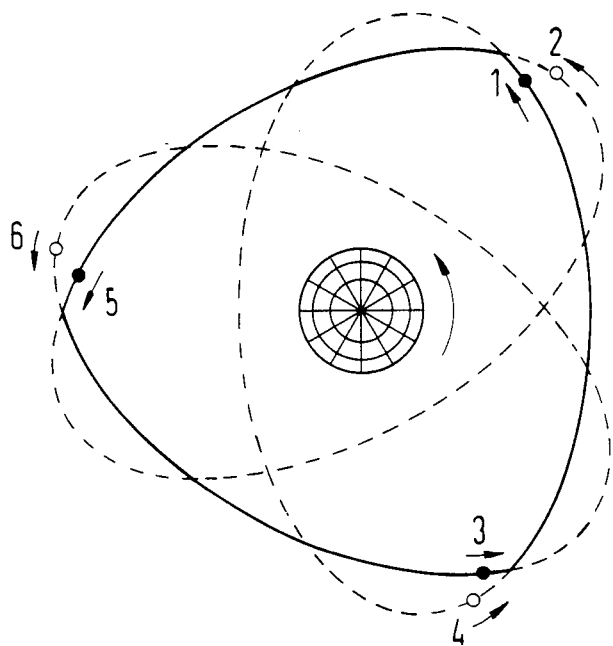
FIG. 2 are the satellite orbits of the system of FIG. 1 as observed by an observer placed above the north pole.

FIG. 2 illustrates the actual orbits of the six satellites illustrated in FIG. 1 from the point of view of an observer above the north pole of the earth. The designations corresponding to FIG. 1 are recorded at the same instant. In this specific embodiment, two satellites are located on each elliptical orbit with a chronological spacing of eight siderial hours. The spherical triangle indicated with a heavy solid line consists of three 90° arcs wherein each arc extends 120° around the earth's axis. Since the transmission jobs are transferred to the following satellite at the corners of the spherical triangle, active satellites will uninterruptedly travel the spherical triangle in three times approximately eight siderial hours. The earth turns once around its axis during the same time so that within certain degrees of fluctuation an active satellite can continuously sequence telecommunication operations quasi-geostationarily with an earth station.

Figure 3:
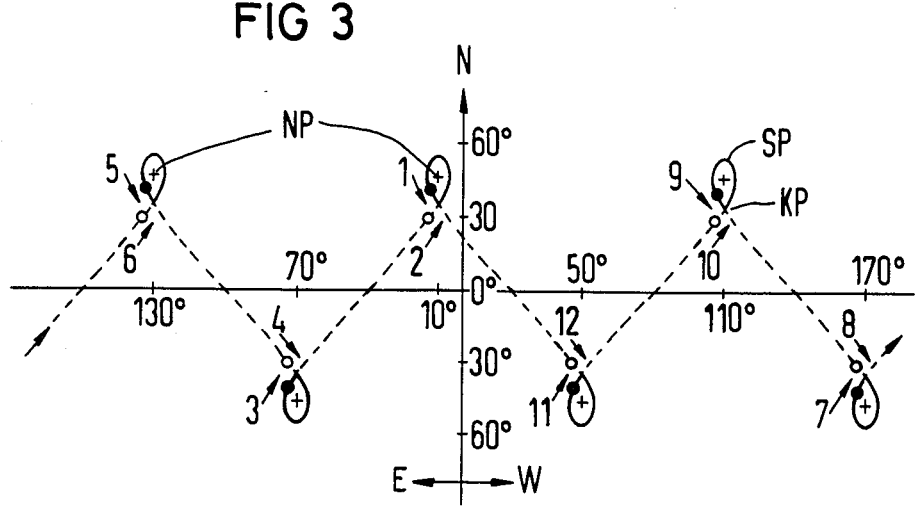
FIG. 3 illustrates a modification of the invention utilizing six active and six inactive satellites.
Figure 4:
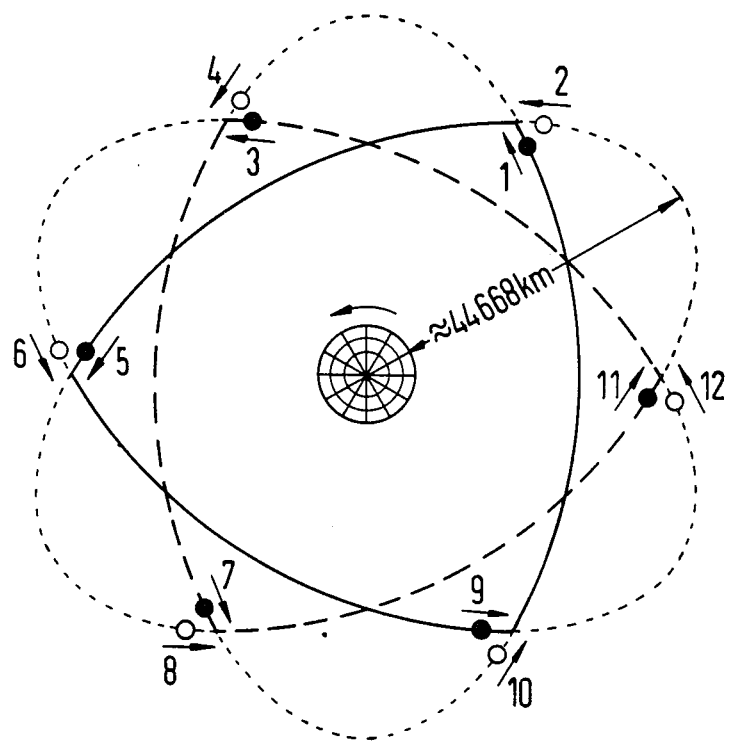
FIG. 4 illustrates satellite orbits of the system illustrated in FIG. 3 as observed from an observer situated above the north pole of the earth.

A further embodiment is illustrated in FIGS. 3 and 4. For simplicity purposes, only one satellite is situated in each active and in each inactive range of the apparent satellite track as illustrated in FIG. 3, although a plurality of satellites would be possibly accommodated under radio engineering principles. In this system, twelve satellites of identical telecommunication functions are utilized of which six are actively located in the loops and the remaining six are crossing the equator during their inactive state. The time of revolution of the satellites is equal to 4/3 of the time at which the earth rotates once about its axis, in other words, approximately 32 hours. The distance from the earth's surface to the satellite is approximately 44,668 km. Both the inactive and the active intervals correspond to 90° of their orbit in other words, approximately eight hours. In this sample embodiment, the satellite orbits have an inclination of approximately 54.7°, thus the apexes SP of the geostationary loops are at 54.7° north and south. In each loop KP, the orbit intersects itself at approximately 35.3° north and south of the equator. In this embodiment, the latitude coordinates of the nominal loop positions NP occur at 45° north and 45° south. Also, if one places a nominal loop position at the longitudinal coordinate of 10° east which is approximately over Milan, Italy, then the other five nominal loop positions result automatically. These will be in the northern hemisphere 130° east over Manchuria, China and 110° west over the State of Wyoming, U.S.A. and in the southern hemisphere at 70° east over the Indian Ocean, 50° west over the Atlantic Ocean off the coast of South America and 170° west over the Pacific Ocean near New Zealand. In this embodiment, the least favorable earth station in Germany would be located in Flensburg, Germany where the antenna must be followed up from the Zenith loop apex to a minimum 67° elevation loop intersection within approximately eight hours. That is the time during which each satellite traverses a loop from the point of intersection of the loop along the loop back to the point of intersection of the loop. After this time, the following satellite which is also situated at the point of intersection of the loop at the transfer time will commence transmission operation. The shut-down of one satellite and activation of the other satellite occurs by the use of the same signal from the earth station, but of the control center. Particularly given access and transmission methods such as TDMA time-division multiple access the changeover time can be accomplished in the protection time between transmitted bursts. The protection time during the changeover is so long that the difference of transit times cause for example, due to different altitudes of the satellites will not lead to burst overlaps.

FIG. 3 schematically shows the apparent path of the twelve satellites which are illustrated as solid circles in their active phase and as blank circles in their inactive phase. The satellites are numbered according to their chronological sequence as they traverse the geostationary loops. The geographical degree of longitude are horizontally entered and the geographical degrees of latitude are vertically entered on the plot. The letters N, E and W relate to north east and west.

FIG. 4 represents the actual orbit of the twelve satellites as observed by an observer above the north pole. The designations correspond to those of FIG. 3 recorded at the same instant. In this specific sample embodiment, four satellites offset by respectively 90° on their orbital paths are situated on each orbital path. The northern spherical triangle illustrated in heavy solid line consists of three 90° arcs and each arc extends 120° around the axis of the earth. This would also be true in the southern hemisphere where a southern spherical triangle which is indicated with heavy broken lines would exist. The orbit of each of the satellites lasts approximately 32 hours thus 90° thereof are covered in approximately eight hours. Since the transmission jobs are transferred to the following satellite at the corners of the spherical triangles, active satellites uninterruptedly traverse the spherical triangles three times in approximately eight hours. The earth rotates once around its axis during the same time so that it within certain degrees of fluctuation an active satellite can permanently sequence telecommunications operations quasi-geostationarily with a ground communication station. With an advantageous satellite system according to the invention wherein three satellites revolve on twelve hour eliptical orbis which are inclined by roughly 63.4° relative to the equatorial plane, two loop positions above opposite meridians occur on the same hermisphere of the earth. The maximum distance from the earth for the satellites will amount to 39,105 km; and the difference from the geostationary satellites is thus small or slight.

Although the invention has been described with respect to preferred embodiments, it is not to be so limited as changes and modifications can be made which are within the full intended scope of the invention as defined by the appended claims.

I claim as my invention:

1. A telecommunications satellite system with geostationary positional loops consisting of a plurality of satellites which orbit on circular or elliptical paths inclined relative to the equatorial plane, wherein relative to a fixed earth station, said plurality of satellites move on the same apparent path with preferably chronologically identical spacings and wherein their apparent paths form intersect loops or, respectively, contacts at equal intervals around the sphere (FIG. 1/FIG. 3), and the points of intersection or, respectively, of contact (KP) of the apparent path are simultaneously traversed by two respective satellites 1 and 2 with one on each of the two orbit branches, and at the time of the smallest spacing of an associated pair of said plurality of satellites relative to one another (in KP), the telecommunication pay-load of the satellite (for example, 1) leaving the geostationary loop is inactivated by a control center and the satellite (for example, 2) simultaneously entering the geostationary loop is activated (FIGS. 1 and 2/FIGS. 3 and 4).

2. A telecommunication satellite system comprising a plurality of earth satellites in spaced circular or elliptical orbits which result in paths which traverse the equator at an angle of incline so that the satellites travel north and south of the equator and each satellite appears to a telecommunication earth station at a fixed location on the earth to travel in the path of an apparent loop which is a portion of its orbit and wherein certain ones of said plurality of satellites being in said loop and being an active satellite as they traverse the apparent loop and when they leave the loop becoming inactive and other ones of said plurality of satellites entering the apparent loop and being active at the time the other satellites become inactive.

3. A telecommunication satellite system according to claim 2 wherein said apparent loops are in the northern and southern hemispheres.

4. A telecommunication satellite system according to claim 2 wherein all of said apparent loops are in one of the two hemispheres only.

5. A telecommunication satellite system according to claim 4 wherein there are at least six satellites.

6. A telecommunication system according to claim 3 wherein there are at least twelve satellites.

7. A telecommunication system according to claim 2 wherein said apparent loops are centered at about 45 degrees latitude.

8. A telecommunication system according to claim 2 wherein said apparent loops extend up to about 54.7 degrees.

9. A telecommunication system according to claim 2 wherein said apparent loops are between 30 and 66 degrees latitude.

* * * * *